Oct. 7, 1958 W. H. RYAN 2,854,697
METHOD OF STRETCHING PLASTIC SHEET MATERIALS
Filed Dec. 14, 1954 2 Sheets-Sheet 1

INVENTOR
William H. Ryan
BY Brown and Mikulka
ATTORNEYS

Oct. 7, 1958          W. H. RYAN          2,854,697

METHOD OF STRETCHING PLASTIC SHEET MATERIALS

Filed Dec. 14, 1954          2 Sheets-Sheet 2

INVENTOR
William H. Ryan

BY Brown and Mikulka
ATTORNEYS

United States Patent Office 2,854,697
Patented Oct. 7, 1958

1

2,854,697

METHOD OF STRETCHING PLASTIC SHEET MATERIAL

William H. Ryan, Billerica, Mass., assignor to Polaroid Corporation, Cambridge, Mass., a corporation of Delaware Application December 14, 1954, Serial No. 475,133

5 Claims. (Cl. 18—48)

The present invention relates generally to the processing of continuous sheets of extensible organic plastic material and the like and, as illustrated herein, relates more particularly to the stretching of such materials.

One object of the present invention is to provide a method for controllably stretching continuous sheet materials and the like by the continuous controlled application of opposed tensional forces and heat which are so applied to the material that the material is restrained from narrowing substantially.

A further object of the invention resides in novel processing procedures for stretching continuous material such as sheets, sheeting, webs, ribbons, foils, films and the like, and especially long-chain, linear polymeric plastic materials of this character, whereby to improve, change or vary the physical and optical properties and characteristics thereof.

A still further object of the invention resides in a method of stretching continuous materials such as sheeting and the like by practices wherein the material is subjected to the action of a pair of tensional forces applied to act respectively in opposite directions and lengthwise of the material substantially uniformly thereacross and at locations spaced apart a distance less than the width of the sheet prior to stretching, whereby to stretch the material and to maintain the width dimension of the material substantially unaltered from the width dimension possessed by the material prior to the stretching thereof and especially to a method of the character described wherein heat is applied to the sheet transversely thereof and along a limited longitudinal extent whereby softening of the sheet is limited substantially in width to a line or very narrow band extending transversely across said sheet of material.

Other objects of the invention will in part be obvious and will in part appear hereinafter.

The invention accordingly comprises the method involving the several steps, and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
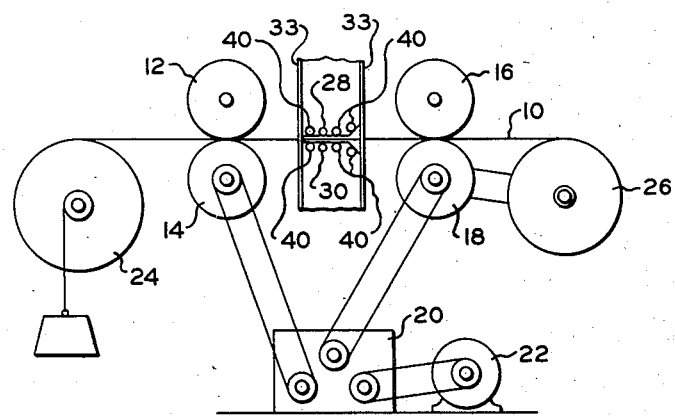
Figure 1 is a diagrammatic view in elevation of apparatus for carrying out the stretching practices of the present invention.

The stretching of plastic materials for various purposes is old. The stretching may effect a change in the optical or physical properties, or both, of the material. Stretch-processing of light-transmitting plastic materials for the purpose of changing the optical properties of the material has been successfully accomplished and is disclosed and claimed in United States Letters Patent No. 2,547,736, granted April 3, 1951 on an application filed in the name of Robert P. Blake, and United States Letters Patent No. 2,547,763, granted April 3, 1951 on an application filed in the names of Edwin H. Land and William H. Ryan. The materials stretched by the methods disclosed in said patents have been successfully employed in the formation of a variety of optical elements such as polarizers, filters, spectacle and goggle lenses, wave retardation elements and the like.

Many hydrophilic sheet materials may be processed by the methods hereinafter detailed and mention may be made of polyvinyl alcohol, the partially hydrolyzed polyvinyl acetals and polyvinyl alcohol esters, polyethylene, amylose, regenerated cellulose, and suitably prepared polyamides or nylon type plastics. Plastic materials of this type are high molecular weight, linear polymeric plastics which are capable of molecular orientation by stretching whereby the materials may be converted from an initial substantially isotropic condition to a condition wherein they display marked birefringence. All materials such as those mentioned above are further characterized by the ability when in oriented condition to form a dichroic sorption complex with dichroic stains and dyes whereby the material is rendered light polarizing.

As examples of nonhydrophilic or hydrophobic plastic materials which may be stretched in accordance with practices of this invention, mention may be made of cellulosic esters such as cellulose acetate and cellulose nitrate, cellulose mixed esters such as cellulose acetate butyrate or cellulose acetate propionate, certain vinyl compounds such as the vinyl acetate chloride copolymers, certain condensation type superpolymers such as suitably prepared polyamides or nylon type plastics as well as other plastics of this character. The hydrophobic plastic materials just named above are also high molecular weight, linear polymers and may have their molecules oriented by suitable stretching practices.

The prior processes have been concerned primarily with the production of sheet materials having relatively high birefringence which, when treated with suitable dichroic stains or dyes, have formed effective polarizers having a relatively high transmission when the polarizers have their axes parallel and high extinction when the polarizers are crossed. In the prior art, the width or longitudinal extent of the softened area of the sheet has been more or less determined by the arrangement and spacing of the gripping rollers, and dimensional changes in the material during processing and, in some applications, certain losses of substantial areas of the stretched sheet along its edge portions have been treated as unavoidable.

In previous processes in which the width dimension of the sheet is kept as wide as possible, a region of different birefringence and orientation has occurred in a band at each side of the sheet. The outer edge of the material, being unsupported, forms a catenary curve in the stretched area and the sheet adjacent the edge narrows and elongates to a different extent than does the substantially uniform central section. In stretching operations where the orientation direction is parallel to the direction of movement of the sheet at the output end of the machine, these bands have higher birefringence and higher orientation. In stretching operations where the orientation direction is at some other angle to the direction of movement (such as 45°), one band will have higher birefringence and orientation and the other lower.

These edge areas may amount to approximately 30% of the width of the stretched sheet and must be removed by cutting to permit the remainder of the sheet to be used for commercial optical purposes. This loss is substantial both in quantity and in cost since unstretched plastic sheet suitable for optical purposes is relatively expensive and losses of up to 30% or more of the processed material represent a substantial item in the cost of forming optical elements wherein such stretched birefringent material is used.

The present invention contemplates the application of heat or other softening agent to the moving plastic sheet over an extent longitudinally of the sheet which can be controlled and which may be limited in width substantially to a line or very narrow strip extending transversely of the sheet. In practice, it is possible to limit the lengthwise extent of the softened area to a narrow band of the order of 1/4 to 1 inch, compared to 3 to 6 inches, or more, in previous processes. Such a narrow softened band reduces "necking down" or narrowing to a minimum while the sheet is in a softened state.

Figure 2:
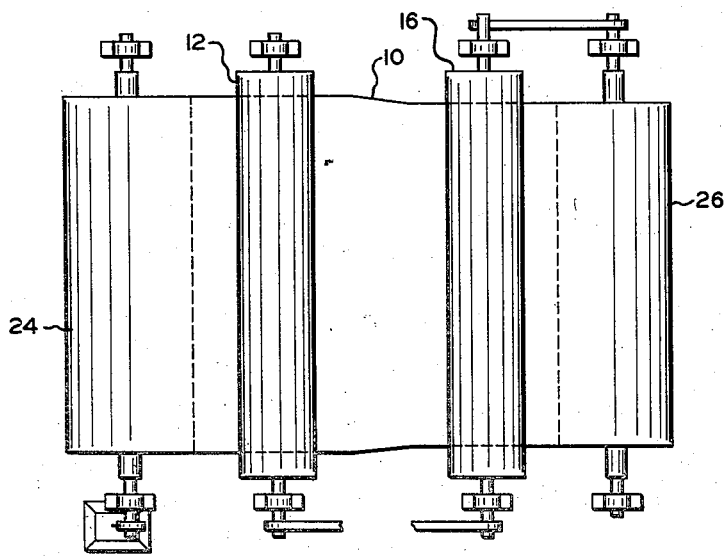
Fig. 2 is a diagrammatic view in plan of the apparatus shown in Fig. 1 with parts omitted for the purpose of simplifying the drawings.

Apparatus employing spaced-apart sets of pressure rolls may be conveniently employed in carrying out the improved practices of the present invention. Suitable apparatus with which the methods of this invention may be practiced is illustrated in Figs. 1 and 2 wherein sheet material 10 is shown undergoing processing in a stretching apparatus comprising a set of input rolls 12 and 14 located closely adjacent to a pair of output rolls 16 and 18. The input and output rolls are of substantially the same diameter and the rolls of each set are rotatably mounted in superposed relation in a suitable stand by conventional means which allow the upper rolls 12 and 16 in the respective roll sets to be releasably held in pressure contact with the corresponding lower rolls 14 and 18. In Figs. 1 and 2, the axes of the various rolls are parallel to each other in both horizontal and vertical planes, although other arrangements may be employed, if so desired. For example, one roll stand may be elevated with respect to the other roll stand. Likewise, similar but higher roll stands could be provided wherein three or more rolls could be used. The input rolls 12 and 14 are driven from a gear box 20 at a lesser peripheral speed than are the output rolls 16 and 18. As shown, only the lower rolls of each set are positively driven while the upper rolls of each set, although freely rotatable, will be rotated at substantially the same peripheral speed as the driven roll in that set. The gear box 20 is driven from any suitable source of power such, for example, as an electric motor 22. The power take-off shafts of the gear box 20 are rotated at the speed differences required to provide a desired speed ratio for the input and output rolls. As illustrated, this speed ratio for the input and output rolls may be of the order of 1:3 or greater, if so desired. Sheet material 10 is obtained from a stock roll 24 which is rotatably mounted at one end of the machine and the sheet is threaded between the input rolls 12 and 14 and the output rolls 16 and 18 and thence is wound up on a take-up roll 26. Input and output roll sets are spaced apart a distance of about 6 to 10 inches sufficient to provide space for means for heating or softening the sheet as it is drawn between the input and output rolls.

The softening means comprises electrical or other suitable heating elements 28 and 30 mounted above and below the sheet 10. Preferably the heating elements are each spaced about 5/16 of an inch from the upper and lower surfaces of the sheet 10. Vertically extending stands 32 are provided at each side of the machine between the input and output rolls. As shown most clearly in Figure 3, the stands 32 are secured to the base frame in any suitable manner and are each provided with a pair of vertically extending side members 33 which extend upwardly and are arranged to adjustably support upper and lower insulating blocks 36 and 38 extending entirely across the machine. Each of these blocks is substantially identical and hence it is necessary only to describe one of them. The upper block 36, for example, is provided with a plurality of longitudinally extending grooves or recesses 34 arranged to receive cooling tubes 40, and the fourth channel is arranged to receive the heater element 28. Adjacent to each end portion of the blocks 36 and 38 are threaded rods 42 which extend through the blocks 36, 38 and through vertical slots formed in the side pieces 33 of the support 32 and are arranged to receive wing nuts 48 which clamp against the side pieces 33 and maintain each of the blocks 36 and 38 in proper adjusted position as close to the upper and lower surfaces of the sheet 10 as may be necessary to obtain adequate softening of the sheet 10.

Figure 3:
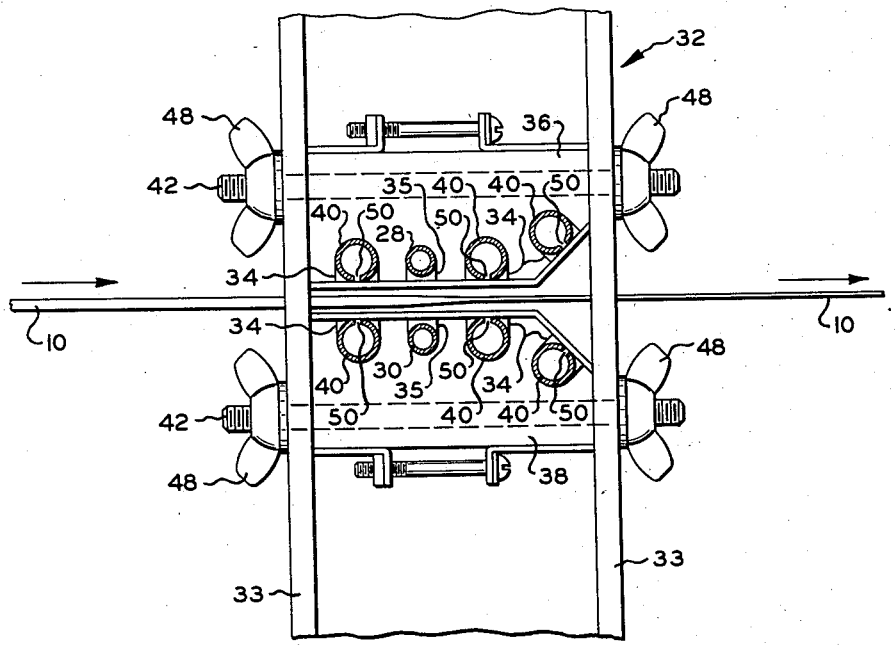
Fig. 3 is a view in elevation of a form of sheet-softening means used in the practice of the present invention.

Although the grooves 35, in which the heating elements 28 and 30 are located, are sufficiently deep to prevent heat radiating therefrom from spreading over a substantial extent lengthwise of the sheet 10, it may, under some conditions, be desirable to limit still further the longitudinal extent of the heated or softened area of the sheet 10. Under some conditions, the heated band may be as wide as one inch but it is preferable to limit the width of the band to about 1/4 inch. The cooling tubes 40, as shown in Fig. 3, are provided with narrow slots 50 extending longitudinally of the tubes and transversely of the sheet 10, through which cool air is forced and arranged to strike on opposite faces of the sheet 10 to maintain the sheet as cool as possible to eliminate or reduce softening thereof except for a limited extent directly between the upper and lower heating elements 28 and 30. The stretched sheet 10 is also subjected to a cooling blast from cooling tubes 40 located in the slots 34 formed along the inclined surfaces of the upper and lower blocks 36 and 38. It is evident that by varying the blast of cool air through the slots 50 in the tubes 40, either by varying the temperature or by increasing or decreasing the force of the blast, the longitudinal extent or width of the heated or softened area of the sheet 10 may be varied as desired.

The above described apparatus permits the practice of stretching methods which involve not only the application of stretching forces longitudinally of the sheet 10 but also involve the application of heat to the sheet material along a limited narrow band extending transversely across the sheet between the locations at which the stretching forces are applied to the sheet whereby the sheet is softened transversely along a band of limited longitudinal extent. In other words, heat is applied to the sheet along a narrow band extending transversely of the sheet 10. With such a limited or controlled softened area, there is practically no narrowing of the sheet 10 due to the release of reaction forces set up during the stretching operation which tend to narrow the sheet. As a matter of fact, substantially the entire stretching operation appears to take place within the limits of the softened area.

Figure 4:
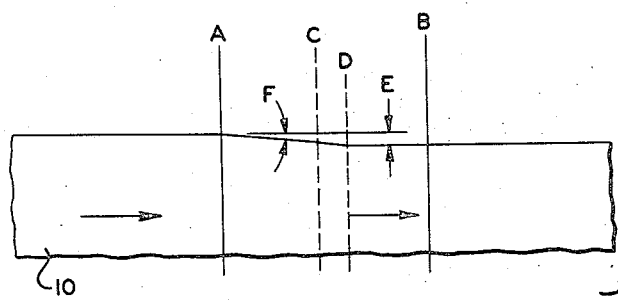
Fig. 4 is a diagrammatic view of the edge portion of a sheet undergoing a stretching operation and illustrating the width characteristics of the sheet before, during and after stretching.

As shown in Fig. 4, which is a diagrammatic representation of an edge portion of a sheet and of the elements necessary in the practice of the present invention, the line A represents the line of contact between the input rolls 12 and 14 and the line B represents the line of contact between the output rolls 16 and 18. These two lines, which represent also the location of the application of stretching forces to the sheet material, are located relatively close together and are spaced from approximately 6 to 12 inches apart and this distance is substantially less than the width of the sheet 10 prior to stretching. The edge angle F, as shown, is relatively small and results in a minimum narrowing of the stretched sheet. The softened area which is represented as lying between the dash lines C and D is very small as compared with the distance between the lines A and B which, as above stated, represent in effect the lines of application of the stretching forces. The softened area in longitudinal extent may be as little as ¼ inch or as much as 1 inch as compared to a spacing of the lines A and B which may be spaced apart a distance of as much as 6 to 12 inches. In any event, the distance between the lines C and D is so small that substantially little narrowing of the sheet takes place at this point.

It is to be noted that substantially the entire stretching of the sheet is accomplished between the lines C and D and no appreciable stretching is accomplished between the lines D and B provided cooling means are used adjacent D. When apparatus of the type disclosed in Figs. 1 and 2 is operating to stretch a polyvinyl alcohol sheet 10, for example, the sheet will be seen to approach the line C at a speed approximately equal to the peripheral speed of the rolls 12 and 14 and upon reaching the line D the speed of the sheet will be substantially equal to the greater peripheral speed of the output rolls 16 and 18. It is clear, therefore, that stretching of the sheet 10, or at least a very substantial part thereof, takes place in the softened area between the lines C and D.

Generally speaking, the degree of molecular orientation and birefringence of plastic sheet material becomes greater with increased elongation of the sheet material and the ratio of the length of the stretched sheet material to the length of the unstretched sheet material may give some indication of the degree of orientation and birefringence. However, this length ratio fails to take into account the situation wherein sheet materials of similar width are stretched the same length but to different widths.

Another and perhaps more accurate expression for indicating the degree of orientation and birefringence is offered in the axial ratio which is obtained by comparing the major and minor axes of an ellipse appearing on longitudinally stretched sheet material and derived, as a result of stretching the material, from a unit circle marked on the material in its unstretched condition. The major axis of such an ellipse will lie in a direction parallel to the direction of stretch and, if the length of the major axis be considered as $l_2$ and that of the minor axis as $w_2$, the axial ratio will be $l_2/w_2$.

Lateral forces which are set up during the stretching of the material and which endeavor to restrain it from narrowing are not uniform in magnitude across the material. Consequently, the axial ratio will vary across the sheet material being processed by prior methods so that the axial ratio, substantially uniform across a wide band in the center of the sheet, will change markedly in narrow bands near the edges of the material.

It is customary, for many purposes, to cut sheet material which has been stretched by processing according to the previous process by removing the edge areas wherein the higher axial ratios occur. This leaves stretched sheet material having an axial ratio which, for general commercial purposes, is sufficiently uniform across the full width of the remaining material. In the present process wherein the longitudinal extent of the softened area is controlled, 24-inch material narrows from one to two inches whereas material stretched under conditions where a substantial longitudinal extent of the sheet is softened during the stretching operation will not only narrow by five to six inches, but in addition edge areas of approximately three inches may have to be cut away on each side of the sheet which results in substantial loss of sheet material.

If, as in the present invention, the softened band is very narrow, there will be little if any shrinking or narrowing of the stretched sheet. The close spacing of the input and output rolls 12 and 16 limits, as in "wide" stretch processing, the narrowing of the sheets during stretching. The narrow band of softened material in the present application is effective still further to reduce narrowing of the sheets. The limited longitudinal extent of the softened area reduces to a minimum the effect of the forces which produce narrowing during the stretching operation. Since narrowing of the sheet is reduced to a minimum, the axial ratio across the width of the sheet will be substantially uniform and consequently there will be little or no loss due to high birefringent edge areas as has been the case with prior stretch processes.

Stretcher design will be dependent upon an interbalancing of various related factors. For example, the temperature range to be used in stretching plastic materials is relatively wide, but the exact temperature will be influenced by the width and thickness of the material to be softened, the speed of movement of the material and the like. Thus, the rate of movement of the material within relatively wide limits will determine the temperature to be used, as will also the thickness of the sheet. Ordinarily, in stretching polyvinyl alcohol for the purpose of improving or increasing orientation or birefringence, stretching temperatures between 150° F. and 450° F. have been successfully employed. When stretching is employed solely to alter the dimensions of the material, the temperature may be increased up to the melting point of the material.

While the use of heat is the most usual procedure for softening the plastic materials mentioned herein, the use of other materials is also contemplated under certain conditions. For example, sodium chloride or sodium sulphate solutions may be used for controlled swelling of polyvinyl alcohol while ethyl acetate may be used for swelling cellulose acetate and the liquids employed for softening may be removed after stretching by washing or by drying the material.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. A method of stretching a continuous extensible material such as an organic plastic sheet material of given width and thickness, said method comprising subjecting the material to the simultaneous action of a pair of opposed tensional forces applied to act lengthwise of the material substantially uniformly thereacross at spaced-apart locations with respect to each other to draw and move the material lengthwise of itself at a given speed while applying a longitudinal stress to the material which tends to lengthen and thin it, softening the sheet material to permit its being stretched longitudinally by said pair of opposed tensional forces without appreciable narrowing by directing radiated heat toward the moving sheet material across a space extending transversely of the sheet material in a manner to provide a sharply defined narrow band of heat of given temperature incident upon the moving sheet material, and subjecting a transverse area, located longitudinally of the stretched sheet material immediately adjacent and to the side of the transverse area which has been softened, to a narrow band of cooled air to retain the sheet material in its stretched condition.

2. A method of stretching a continuous extensible material such as an organic plastic sheet material of given width and thickness, said method comprising subjecting the material to the simultaneous action of a pair of opposed tensional forces applied to act lengthwise of the material substantially uniformly thereacross at spaced-apart locations with respect to each other to draw and move the material lengthwise of itself at a given speed while applying a longitudinal stress to the material which tends to lengthen and thin it, softening the sheet material to permit its being stretched longitudinally by said pair of opposed tensional forces without appreciable narrowing by directing radiated heat toward the moving sheet material across a space extending transversely of the sheet material in a manner to provide a sharply defined narrow band of heat of given temperature incident upon the moving sheet material, and subjecting a plurality of transverse areas of the sheet material, located longitudinally of the sheet to each side of the transverse area which has been softened, to narrow bands of cooled air to retain the sheet material in its stretched condition.

3. A method of stretching a continuous extensible material such as an organic plastic sheet material of given width and thickness, said method comprising subjecting the material to the simultaneous action of a pair of opposed tensional forces applied to act lengthwise of the material substantially uniformly thereacross at spaced-apart locations with respect to each other to draw and move the material lengthwise of itself at a given speed while applying a longitudinal stress to the material which tends to lengthen and thin it, softening the sheet material to permit its being stretched longitudinally by said pair of opposed tensional forces without appreciable narrowing by directing radiated heat toward the moving sheet material across a space extending transversely of the sheet material in a manner to provide a sharply defined narrow band of heat of given temperature incident upon the moving sheet material, and subjecting transverse areas of opposite faces of the stretched sheet material, which lie longitudinally of the sheet immediately adjacent to the transverse area which has been softened, to narrow bands of cooled air to retain the sheet material in its stretched condition.

4. A method of stretching a continuous extensible material such as an organic plastic sheet material of given width and thickness, said method comprising subjecting the material to the simultaneous action of a pair of opposed tensional forces applied to act lengthwise of the material substantially uniformly thereacross at spaced-apart locations with respect to each other to draw and move the material lengthwise of itself at a given speed while applying a longitudinal stress to the material which tends to lengthen and thin it, softening the sheet material to permit its being stretched longitudinally by said pair of opposed tensional forces without appreciable narrowing by directing radiated heat toward the moving sheet material across a space extending transversely of the sheet material in a manner to provide a sharply defined narrow band of heat of given temperature incident upon the moving sheet material, and subjecting a transverse area, located longitudinally of the stretched sheet material immediately to the side of the area which has been softened, to a restricted narrow band of cooled air applied under pressure at an angle of substantially 90° relative to the surface of the sheet material to retain the sheet material in its stretched condition.

5. A method of stretching a continuous extensible material such as an organic plastic sheet material of given width and thickness, said method comprising subjecting the material to the simultaneous action of at least a pair of opposed tensional forces applied to the sheet material at given spaced-apart locations along its surfaces to move the material in at least a given direction at a given speed and to apply a stress to the sheet material to permit its being stretched by said opposed tensional forces without appreciable narrowing by directing radiated heat from a source in spaced relation to the sheet material toward the material while in motion throughout an area extending transversely of the sheet material to subject the material to an application of a sharply defined narrow band of heat of given temperature, at the same time applying narrow bands of cooling air to transverse areas of the sheet located at each side of the applied band of heat, the bands of cooling air being applied between the locations of the applied tensional forces.

References Cited in the file of this patent

UNITED STATES PATENTS

| 2,547,763 | Land et al. | Apr. 3, 1951 |
| 2,763,029 | Tulloss | Sept. 18, 1956 |

FOREIGN PATENTS

| 497,788 | Great Britain | Dec. 28, 1938 |